(12) United States Patent  
Burczyk et al.

(10) Patent No.: US 8,979,117 B2
(45) Date of Patent: Mar. 17, 2015

(54) AIR CUSHION WITH A CHANNEL-SHAPED CLOSURE ELEMENT

(75) Inventors: Christian Burczyk, Stuttgart (DE); Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 75 days.

(21) Appl. No.: 13/129,141

(22) PCT Filed: Oct. 30, 2009

(86) PCT No.: PCT/EP2009/007792
§ 371 (c)(1),
(2), (4) Date: Jun. 27, 2011

(87) PCT Pub. No.: WO2010/054754
PCT Pub. Date: May 20, 2010

(65) Prior Publication Data
US 2011/0248487 A1    Oct. 13, 2011

(30) Foreign Application Priority Data

Nov. 14, 2008   (DE) .......................... 10 2008 057 376

(51) Int. Cl.
*B60R 21/231*    (2011.01)
*F16K 3/12*      (2006.01)
*B60R 21/239*    (2006.01)

(52) U.S. Cl.
CPC ..... *B60R 21/239* (2013.01); *B60R 2021/23115* (2013.01)
USPC .......... 280/728.1; 280/739; 280/740; 251/61; 251/61.1; 137/843

(58) Field of Classification Search
USPC ................ 280/728.1, 739, 740; 251/61, 61.1; 137/843–844
See application file for complete search history.

(56) References Cited

U.S. PATENT DOCUMENTS 3,887,213 A * 6/1975 Goetz ........................... 280/738
3,960,386 A * 6/1976 Wallsten ....................... 280/731
(Continued)

FOREIGN PATENT DOCUMENTS

DE    70 48 410 U1    4/1971
DE    2 409 409 A1    8/1974
(Continued)

OTHER PUBLICATIONS

International Search Report with partial English translation dated Dec. 15, 2009 (nine (9) pages).
German Office Action dated Jun. 23, 2009 (four (4) pages).
Form PCT/ISA/237 (seven (7) pages).

*Primary Examiner* — Paul N Dickson
*Assistant Examiner* — Darlene P Condra
(74) *Attorney, Agent, or Firm* — Crowell & Moring LLP

(57) ABSTRACT

The restraining function of support structure airbags in particular and mechanical airbags should be able to be specifically guaranteed in a simple manner. To this end, an air cushion for an airbag of a motor vehicle is provided, having a sleeve with at least one opening and a closure element arranged on the at least one opening in order to at least partially prevent air from flowing from a first direction, Furthermore, the closure element is flexible and has a channel-shaped design at least upon the flow of air from a second direction opposite the first direction. The closure element thus has the effect of a check valve.

25 Claims, 5 Drawing Sheets

(56) References Cited

U.S. PATENT DOCUMENTS

| | | | |
|---|---|---|---|
| 3,970,328 A * | 7/1976 | Wallsten | 280/731 |
| 5,401,566 A * | 3/1995 | Magee et al. | 442/136 |
| 5,542,695 A * | 8/1996 | Hanson | 280/729 |
| 5,803,121 A * | 9/1998 | Estes | 137/849 |
| 6,402,190 B1 | 6/2002 | Heudorfer et al. | |
| 2002/0027351 A1* | 3/2002 | Keshavaraj | 280/743.1 |
| 2002/0089158 A1* | 7/2002 | Fischer et al. | 280/740 |
| 2002/0125703 A1 | 9/2002 | Reiter et al. | |
| 2003/0209895 A1* | 11/2003 | Gu | 280/739 |
| 2004/0090054 A1 | 5/2004 | Bossecker et al. | |
| 2007/0052222 A1 | 3/2007 | Higuchi et al. | |
| 2007/0170710 A1* | 7/2007 | Bouquier | 280/739 |
| 2009/0322062 A1 | 12/2009 | Bauer et al. | |
| 2010/0259034 A1 | 10/2010 | Hirth et al. | |
| 2011/0056569 A1* | 3/2011 | Chambo et al. | 137/14 |

FOREIGN PATENT DOCUMENTS

| | | | |
|---|---|---|---|
| DE | 199 30 155 A1 | | 1/2001 |
| DE | 101 11 566 A1 | | 9/2002 |
| DE | 102 36 859 A1 | | 2/2004 |
| DE | 10 2005 019 748 A1 | | 11/2006 |
| DE | 10 2006 038 124 A1 | | 2/2008 |
| DE | 10 2006 038 125 A1 | | 2/2008 |
| EP | 1 595 751 A1 | | 11/2005 |
| JP | 48-80229-01 U | | 10/1973 |
| JP | 48-113024 U | * | 12/1973 |
| JP | 8-268213 A | | 10/1996 |
| JP | 2000052916 A | * | 2/2000 |
| WO | WO 2007/110167 A1 | | 10/2007 |

* cited by examiner

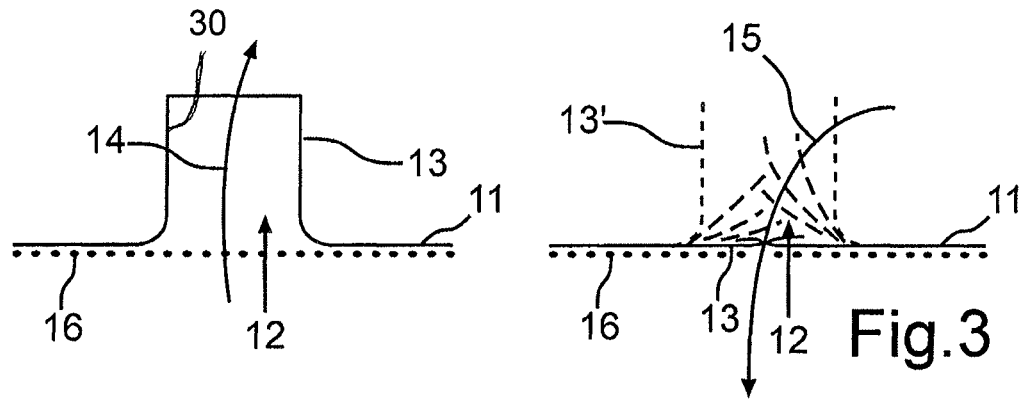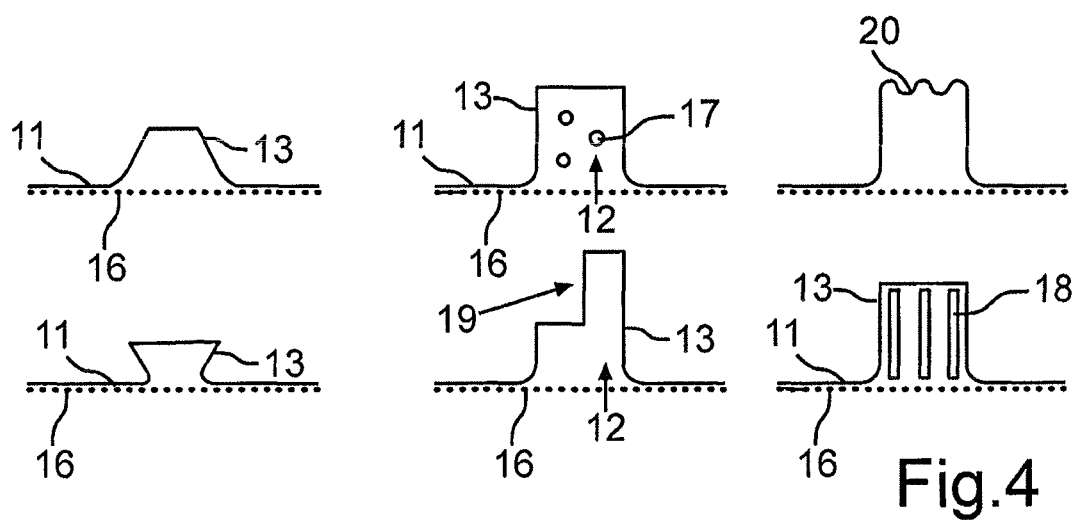
Fig.3
Fig.4
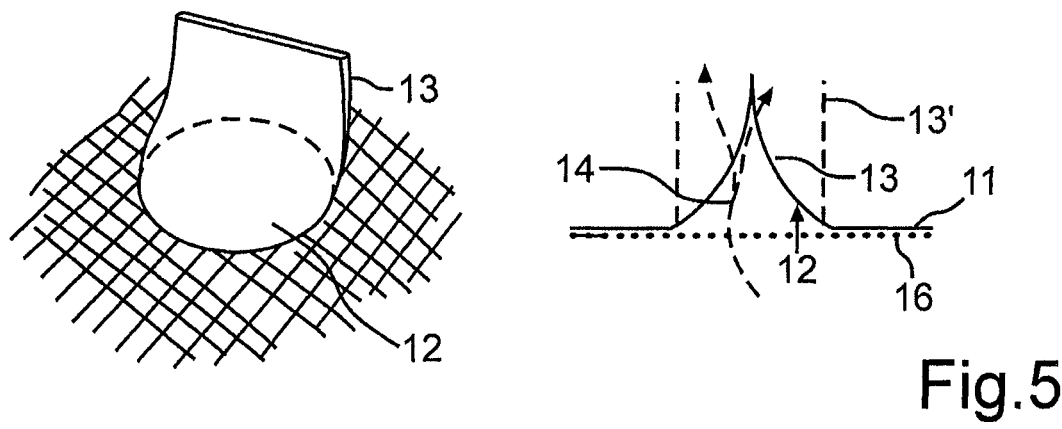
Fig.5

AIR CUSHION WITH A CHANNEL-SHAPED CLOSURE ELEMENT

CROSS-REFERENCE TO RELATED APPLICATIONS

The present application is a national stage of PCT International Application No. PCT/EP2009/007792, filed Oct. 30, 2009, and claims priority under 35 U.S.C. §119 to German Patent Application No. 10 2008 057 376.0, filed Nov. 14, 2008, the entire disclosures of which afore-mentioned documents are herein expressly incorporated by reference.

BACKGROUND AND SUMMARY OF THE INVENTION

The present invention relates to an air cushion with a sleeve having at least one opening, and a closure element, which is arranged at the at least one opening, in order to at least partially prevent a flow-through of air from one direction. The present invention also relates to an air bag for a vehicle with such an air cushion.

From the series production of passenger motor vehicles, restraint systems in the form of air bags with multiple designs are known. These air bags generally have a restraint volume limited by a sleeve, which can be enlarged from a storage position to a restraint position. The air bag normally folded in the storage position is filled pyrotechnically with gas when detecting an accident, so that it deploys suddenly towards the displacing occupant and thus contributes at least indirectly to his restraint.

Patent documents DE 10 2006 038 125 A1 and DE 10 2006 038 124 A1 disclose a so-called "support structure air bag." The support structure can be moved from a storage position to a restraint position by means of a gas flow, in that a plurality of connected hollow bodies forming a channel system are inflated with a gas. Planar elements with air flow openings are provided between the hollow bodies. The planar elements together form an air cushion, which encloses the restraint volume. When deploying the air bag, surrounding air flows through the air flow openings into the interior of the air cushion, and the air flows again to the outside through the air flow openings when restraining the vehicle occupant. Apart from air flow-through openings which are covered by the occupant himself during the impact, the outflow of the air takes place at the same speed as the inflow. It is, however, necessary under certain circumstances to maintain the restraint function for a longer period of time.

Additionally, a so-called "mechanical air bag" is known from patent document DE 10 2007 022 925 A1 by the applicant, in which a bar system can be unfolded, similar to an umbrella, which serves as a support structure for the air cushion. Air flow-through openings are also provided in the sleeve, through which surrounding air flows when unfolding the air bag.

Patent document DE 10 2008 037 811 A1 further discloses a restraint system for occupants of a motor vehicle with support elements and sleeve elements applied thereto, so that a restraint volume is formed. The flexible sleeve elements are arranged between the support elements and have air flow-through openings. A resistance element is arranged at each of the air flow-through openings to impede or prevent an outflow of air from the restraint volume compared to the inflow at the respective air flow-through opening.

An object of the present invention is to simplify the restraint function of a so-called "support structure" air bag.

This and other objects are achieved by the present invention by an air cushion with a sleeve having at least one opening, and a closure element, which is arranged at the at least one opening, in order to at least partially prevent a flow-through of air from a first direction, wherein the closure element is flexible and has a channel-shaped design at least upon the flow of air from a second direction opposite the first direction.

In an advantageous manner, a closing function is provided by the flexible closure element, which is formed in a channel-shaped manner with the flow of air, in a simple and reliable manner, so that the air can be blown off in a restricted manner for the restraint or for the dampening. An air bag can thus be provided with flow-through openings at the air cushion surface. A flexible tube may be respectively fastened at one or several of the flow-through openings. The tube is not fastened at the other end and is free. Gas can flow through the opening in a largely unimpeded manner thereby in the direction of the free end. With a gas flow in the reverse direction, the tube or parts thereof tilts in such a manner that the opening is closed at least partially.

The closure element may have parallel (as with the mentioned example) or converging limiting walls in the flown-through state. Flexible limiting walls formed in such a manner ensure with a high security that they abut each other from the outside or at least partially displace, for example, the opening during the inflow.

According to another embodiment, the main flow direction of the closure element can clearly deviate from an angle vertical to the surface defined by the opening during the flow-through of air in the second direction. A certain deflection of the gas flow during the inflow can be achieved thereby.

It is particularly advantageous if the closure element is fastened to the sleeve at a side enclosing the opening of the sleeve. Air or gas thereby flows through the opening and subsequently through the channel-shaped closure element.

The closure element can additionally have several air-permeable recesses in addition to the two main flow openings at the face side. These recesses can serve for the reduction of the flow resistance on the one hand and for the specific abutment of the limiting walls of the closure element on the other hand.

The closure element can further be flat in the state that is not flown through and have a recess, which is clearly smaller than the opening of the sleeve. Thus, the folding of the air cushion can be eased and an adhesion of the closure elements can be prevented.

The closure element can further have a screw-like pre-orientation, so that it is tube-shaped in the unwound state and disk-shaped in the wound state. This screw-like pre-orientation can be used so that the closure element does not fold flat itself in the flown-through state.

According to a further embodiment, the opening is covered by an air-permeable, flat structure. The flat structure can be a net. It prevents the closure element from passing through the opening to the other side of the sleeve with a high pressure.

According to a further exemplary embodiment, a separation element or a binding element is applied to the closure element, which assists or prevents the limiting walls of the closure element from separating again after a mutual contact.

According to another exemplary embodiment, an air bag for a vehicle is equipped with an air cushion described above.

The present invention is now explained in more detail by means of the enclosed drawings.

BRIEF DESCRIPTION OF THE DRAWING FIGURES

FIG. 3 illustrates a cross section through the closure element of FIG. 2;

FIG. 4 illustrates cross sections through several different closure elements;

FIG. 5 illustrates a perspective and a section of a further closure element;

Figure 6:
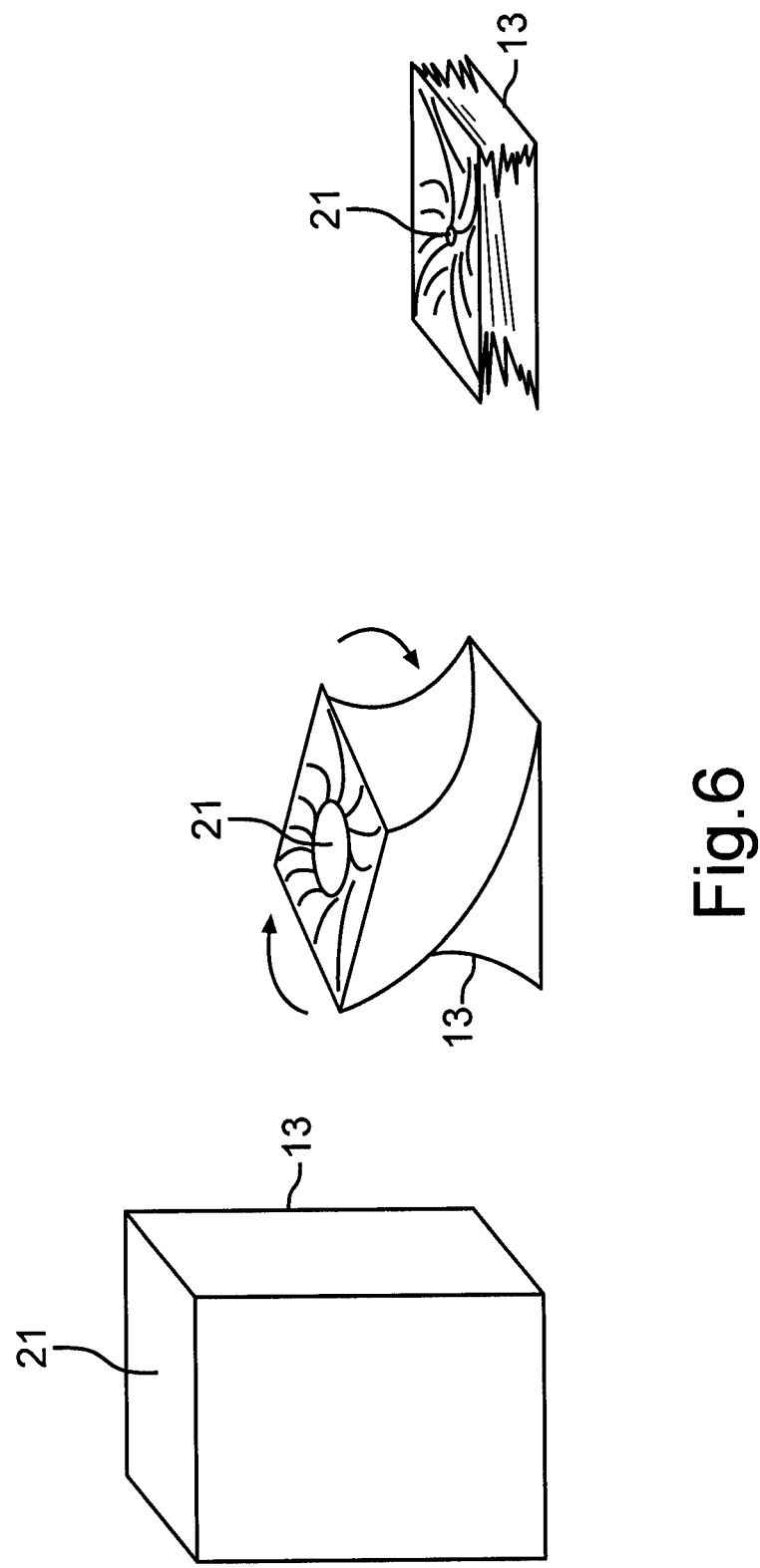
Figure 7:
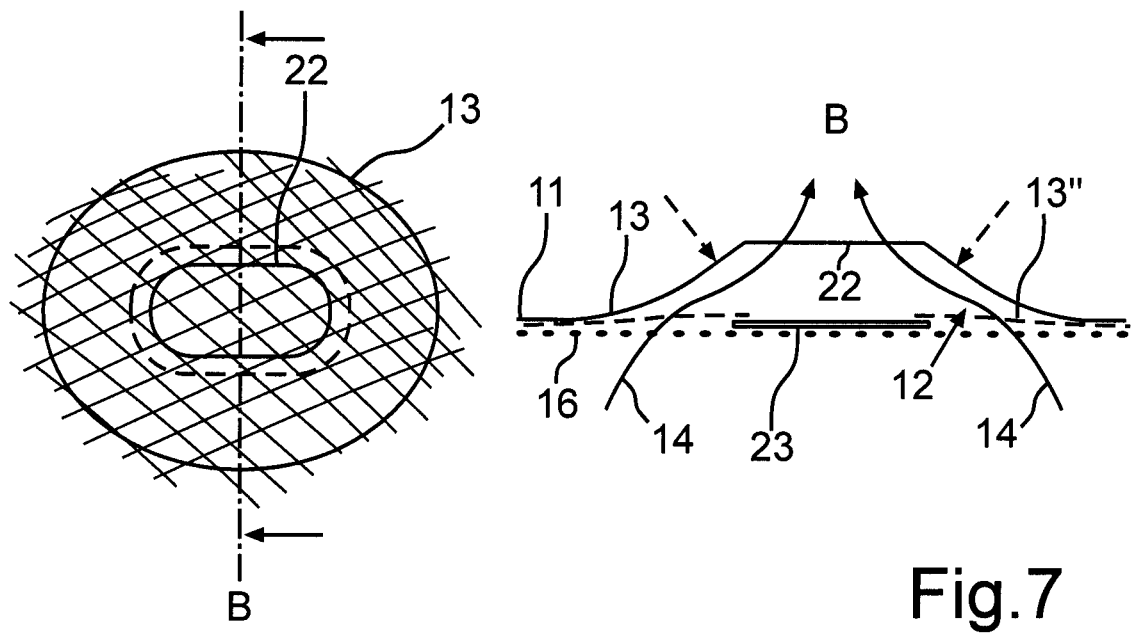

FIG. 6 provides views of a closure element with pre-orientation;

FIG. 7 illustrates a flat closure element according to the first embodiment and

Figure 8:
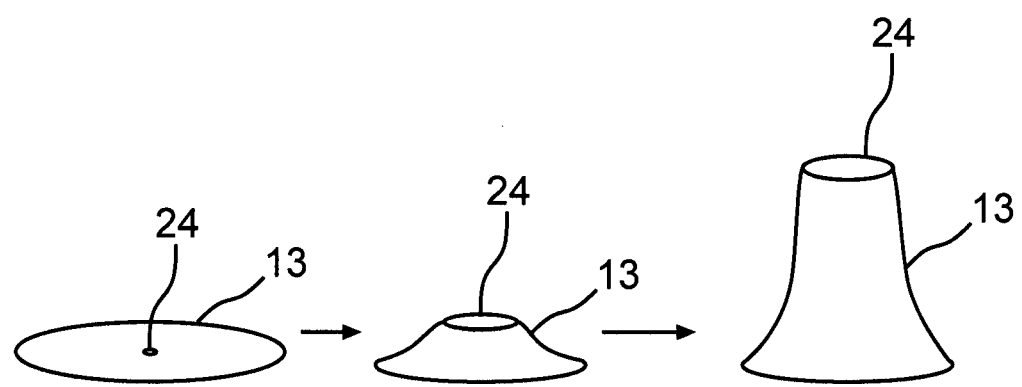

FIG. 8 illustrates a flat closure element according to a second embodiment.

DETAILED DESCRIPTION OF THE DRAWING FIGURES

The embodiments illustrated in the drawings are described below in more detail.

The starting point of the present invention or of the embodiments are the so-called "support structure air bags" as restraint system. The number, size and position of inflow or outflow openings are, amongst other features, essential for the deployment and the restraint function.

Figure 1:
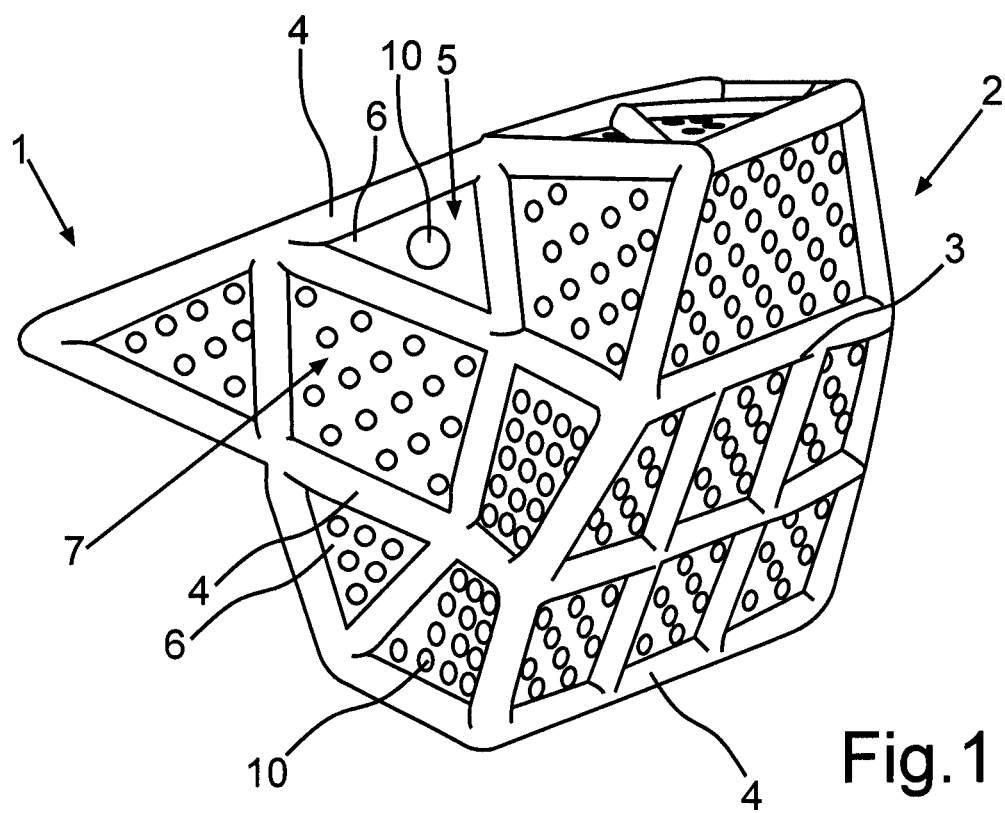
FIG. 1 illustrates a support structure air bag in perspective.

FIG. 1 shows a support structure air bag 1 in its fully deployed restraint position. It comprises a support structure 2, which is created by a plurality of hollow bodies 4 connected to each other while forming a channel system 3. The hollow bodies 4 are formed as a tube-shaped tube body, which are connected to each other to a framework-type or frame-type channel system 3. Thus, the hollow bodies 4 consist of a flexible tubular material to be filled with gas.

By means of the hollow bodies 4 connected to each other as a framework, individual compartments 5 of the support structure 2 are thus created, which are filled by planar elements 6. These planar elements 6 consist of a flexible material such as a fabric or rubber material. The planar elements 6 altogether form an air cushion or a sleeve 7, by means of which a restraint volume enclosed by the support structure 2 is enclosed. The sleeves or planar elements have openings 10 for the inflow and possibly for the at least partial outflow of surrounding air.

Figure 2:
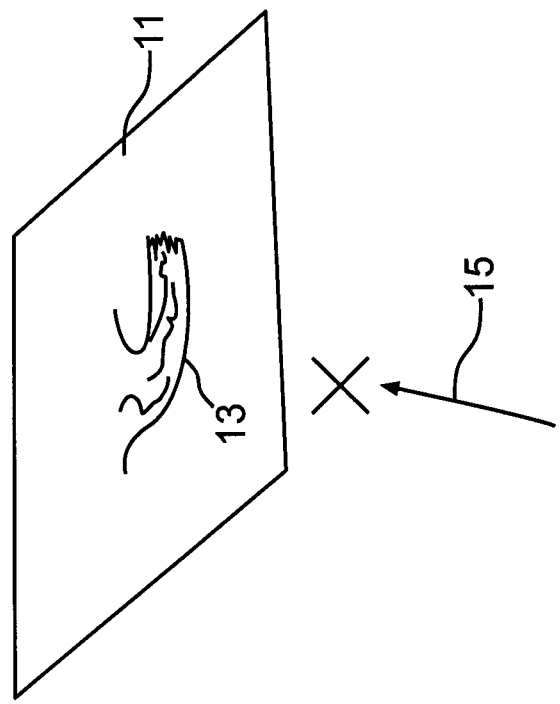
FIG. 2 illustrates a closure element according to the invention in the flown-through and the non flown-through state.
Figure 2:
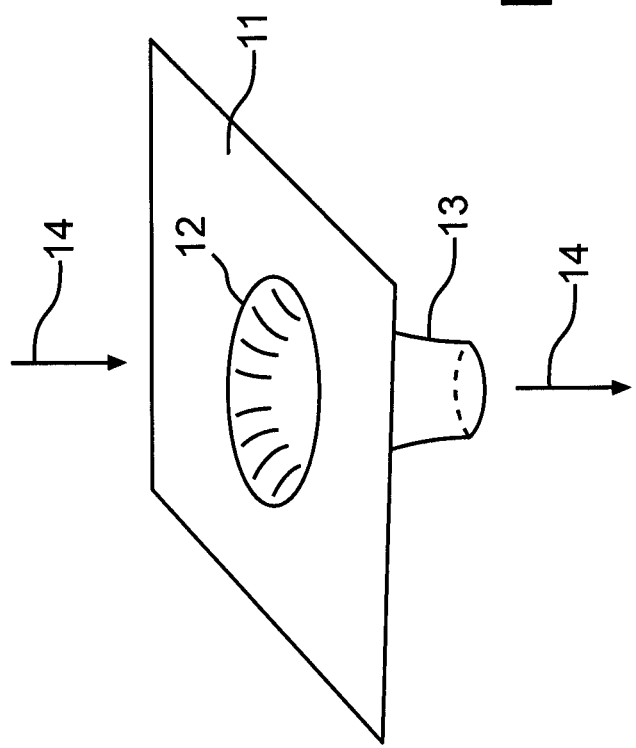

The present invention is based on the idea that the flow resistance is low during the inflow of the air through openings of the sleeve and is high compared thereto during the outflow, so that an improved restraint effect can be achieved. This basic idea can be realized by the principle of the check valve. FIG. 2 shows a closure element which can be applied to one or more openings 10 of the air bag or the air cushion 7. Depending on requirements, such a closure element is arranged at all of the openings 10 or only individual ones of these openings 10.

In the left half of FIG. 2, the closure element is shown in the flown-through state. The sleeve 11 has an opening 12. The upper side shown in the figure corresponds to the outer side of the air bag or of the air cushion. A tube-shaped closure element is fastened flush to the opening 12 on the lower side. The tube-shaped element 13 is thus connected tightly to the sleeve 11 at one face side, so that gas, when it flows from the upper side to the lower side, flows through the opening 12 into the tube-shaped closure element 13, which has a channel-shaped design in the flown-through case (see flow arrows 14). The case shown on the left in FIG. 2 shows the state of the inflow of air into the air bag.

In the restraint state, the air bag is under pressure compared to the surroundings, so that gas or air wants to flow out. The flow direction is represented with an arrow 15 in the image on the right side of FIG. 2. As the tube-shaped closure element is, however, very soft and flexible, it collapses at the lower side of the sleeve 11, when no flow is present any longer from above to below or from the outside to the inside. A gas flow from below to above is thus prevented or reduced by means of the closure element 13.

FIG. 3 again shows a cross section through the closure element 13 in the flown-through state (left) and when abutting the closure element 13 at the sleeve 11 or at a net during reversal of the flow direction (right). The inner side of the air bag is, however, at the top here and the outer side of the air bag below. If air flows from the outside to the inside (left side drawing), the tube-shaped closure element 13 is thus deployed and extends essentially vertically to the surface of the sleeve 11 with its longitudinal axis. A net 16 is provided at the outer side of the sleeve in the region of the opening 12.

On the right side of FIG. 3 is shown the closure element 13 in the case that the air flow would take place from the inside to the outside according to arrow 15 (corresponding to the right side of FIG. 2). The dashed lines 13' indicate, starting from the form according to the left side of FIG. 3, how the closure element gradually collapses and finally closes the opening 12 completely. The net 16 now prevents the flexible closure element 13 from pressing to the outside through the opening 12 and then again would free the flow opening. The function of the net can also be fulfilled by a perforated air cushion region or sleeve region.

The tube-shaped closure element 13 may be produced from a plastic film or a silicon skin.

The channel-shaped, flexible flow-through region of a closure element may be realized by the limiting walls essentially proceeding parallel to each other. The closure element 13 can, however, also have, as shown in FIG. 4, other alignments and designs of the limiting walls. The channel can thus, for example, have a conical tapering cross section towards its free end according to the left upper example of FIG. 4. Alternatively, the channel can widen towards its free end as is shown in the left lower example of FIG. 4. The closure element can also have a barrel-shaped design in its cross section, but also a prism-shaped design, a hyperboloid design and the like.

In the center and on the right side of FIG. 4, respectively, different embodiments of closure elements are shown, which have different recesses. The example in the center has several small circular recesses 17, which ensure under certain circumstances that the openings 12 are not completely closed during the counterflow. The elongated recesses 18 corresponding to the diagram of FIG. 4 at the right below have similar features to the recesses 17. The flow resistances are further reduced hereby. In the example in the lower center of the drawing, one tube half or a tube wall is missing completely in the upper part of the closure element 13. A relatively large recess 19 results thereby. This can be advantageous if, for example, the remaining tube half or tube wall bends easier thereby and the opening 12 can thus be closed quicker. A further example of a closure element is shown in FIG. 4 at the top right, where the upper free edge of the channel is corrugated or tooth-shaped. This is also achieved by recesses 20 in the furthest sense. These recesses basically have the purpose that less material is present, which can prove to be disturbing when folding the channel.

It can be stated in general that parallel walls do not effect a gas deflection with the closure elements, while oblique walls effect this generally. In certain cases, a pre-orientation for the distinct aligning/abutting can be desired with inflow by means of gas.

The channel-shaped region of the closure element 13 is connected to the sleeve 11 or the air cushion surface at one end and is essentially free at the other end. By means of a force or a limiting element, a movement of the flow-through region can be influenced. This can be useful for the distinct abutment/sealing or for reducing undesired movements, e.g., fluttering. The sealing can however also be aided by certain forms or geometric orientations. The closure element according to FIG. 5 can consist of a tube flattened against one end, which can additionally also be oriented obliquely. The channel-shaped closure element with flattened ends is shown in perspective on the left side of FIG. 5. In the illustrated case, the closure element 13 is not flown through. In the cross section on the right side of FIG. 5 it can be seen that the flat walls of the closure element 13 abut and form a peak over the opening 12. Only when an air flow 14 passes through the closure element, it opens, for example, to parallel walls 13'. A pressing through of the closure element 13 through the opening 12 can possibly be prevented when applying a counter-pressure through a net 16. The net may not impede the gas flow too much during the inflow, so that the air cushion can fill with gas in a timely manner.

The closure elements can however also have further convenient designs. The channel formed by the closure element thus does not necessarily have a round or a square dimension. It can rather also be triangular, polygonal, rectangular, etc. The closure elements can additionally be realized by combination of several tubes (e.g., tube in tube; different lengths, diameters, openings, etc.). Analogously to the closure element illustrated in the lower center portion of FIG. 4, a four-edged channel with only one, two or three of the four walls can be realized, which can also have different lengths.

A further embodiment of a closure element according to the invention is shown in FIG. 6. It is a pre-tensioned tube that can be twisted with regard to a longitudinal axis (main flow direction). It is shown in FIG. 6 on the left side in its flown-through state, i.e., in its folded-out or wound state. For a better illustration of its working principle, it is chosen here with a square outline. It has a large opening 21 in the flown-through state. If the tube is no longer flown through, it winds according to the center image of FIG. 6. Its height and also its flow-through opening 21 is thereby reduced. In the right image of FIG. 6, the tube, that is, the closure element 13, is shown in its completely wound state. The opening 21 is possibly reduced up to the complete closure and the "tube" now takes on a disk shape.

A further example of a closure element 13 is shown in FIG. 7 in a plan view on the left side and in a cross section on the right side. It represents an extensible disk with a suitably small hole 22 in the relaxed state, which is not flown through. The disk is fastened in an annular shape to the sleeve 11 at its outer circumference. If the closure element is now applied with a gas pressure from below or from the outside, the disk bulges upwards in its center and the hole 22 widens (see FIG. 7, right side). The gas flows corresponding to the arrows 14 from the outside to the inside. In the relaxed state, that is, in the flow-free state, the bulge of the disk lies again and the disk will become flat again according to the dashed lines 13". An additional disk-shaped seal may be provided below the annular disk-shaped closure element, which is a little larger than the hole 22 in the relaxed state. In the flow-free state, this disk 23 then practically seals the hole 22 completely. The additional sealing disk 23 can be held in the opening 12 by means of a net 16. As the hole 22 moves out of the plane of the sleeve 11 when the air flows through, a channel 13 is also formed in this state by means of the closure element 13.

FIG. 8 illustrates a version of the example of FIG. 7. The disk-shaped closure element 13 here only has a very small hole 24 in the relaxed state, through which practically no air exchange is possible (see FIG. 8, left side). In the center of FIG. 8, the closure element 13 is shown with a low air flow. It has already bulged in the center and the opening is widened correspondingly. With a higher air flow, from below or from the outside, the closure element 13 expands still further to above according to the right side of FIG. 8 and the opening 24 becomes still larger. A distinct channel form can be again seen here. With an air pressure in the opposite direction, the closure element 13 would correspondingly expand downwards, if this is not prevented by a net below or a correspondingly perforated sleeve. Due to the small hole 24 in the relaxed state, no additional hole seal 23 is necessary in this example as in the example of FIG. 7.

The following general basic principles are used by the present invention:

On the one hand, a flow direction-dependent characteristic is used, according to which the flow resistance depends on the flow direction. On the other hand, an inflow with no or only a small deflection of the gas flow takes place. Furthermore, the circumstance is used that the flow channel is (oriented) essentially stable, while it is instable with the direction reversal or closed partially or completely. The back pressure and/or the Bernoulli effect can also for example be used. Closure forces in different directions can be generated thereby (parallel to the or in the flow direction and transversely to this). A better and safer automatic seal can be achieved hereby.

The instable state can further be directed into a desired direction by means of an initial force (e.g., by spring tension or gas inflow), such as for specific abutment/sealing. A stable state can also be stabilized further, for example, by geometric limitation (such as holding straps or bars), in order to avoid fluttering.

The functions of the sealing (e.g., by silicon skin) and of the supporting/the rigidity (e.g., by an air-permeable net structure) can be realized by different layers or materials.

In order to obtain a gas seal which is as good as possible, the regions responsible for this, which abut for the folding of the flexible channel-shaped flow-through region, can be designed correspondingly and adjusted with each other. This can also relate to the material of the air cushion surface or the supporting air-permeable material in the flow-through region. This can, for example, take place by means of a suitable form-fit, which can be achieved by a hook and loop type design, such as a product sold under the trademark Velcro®, increase of the friction, etc. The gas seal can however take place additionally or alternatively by a corresponding force-fit (e.g., pressing the region by the gas pressure). Thus, a coating (e.g., silicon) can possibly only lead to an improved seal locally.

In order to reduce or to avoid an adhesion of the flow-through region by folding or compression of the air cushion in the storage position in the air bag module or by ageing/temperature influences on the other hand, it can be advantageous to apply a separation element (e.g., talcum) at those locations which have to release from each other quickly enough for the provided function. Alternatively, a binding element 30 may be applied to the closure element 13 to prevent the limiting walls of the closure element from separating again after a mutual contact.

So that the flow-through opening can be closed, the surface of the limiting walls of the flow-through region (e.g., the tube-shaped channel) has to be at least the same as the surface of the flow-through opening. For example, the length of the tube has to be at least the same as the radius of the round flow-through opening with a round, tube-shaped parallel channel. The folding of the channel can further take place in a chaotic or orderly manner or in a combination of both.

In many cases, it is important to prevent a backflow as quickly as possible. This can be ensured in that the closure elements, that is, the movable, flexible flow-through regions have a mass as low as possible. In addition, they should be as flexible as possible. This can be influenced, for example, by the thickness and the material properties of the limiting walls.

The solution principle according to the invention can primarily also be realized in a flexible planar structure (e.g., an air cushion structure). A one piece woven material or a film can be used, into which are integrated corresponding closure elements. The openings and closure elements thereby may have macroscopic or microscopic dimensions. When manufacturing the air cushion, no additional manufacturing steps are thus necessary. Furthermore, a combination of different manufacturing types (e.g., weaving and coating) or materials (e.g., one-piece woven structure and film) is possible.

All the above-described types of closure elements can be used singly, in plurality and combinations as mentioned. Other air bags can also use this in certain circumstances.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An air cushion comprising:
   a support structure including a plurality of sides and a plurality of tube-shaped hollow bodies on each of the plurality of sides, the tube-shaped hollow bodies being connected to each other and planar elements disposed between the hollow bodies;
   a sleeve including at least one opening;
   a closure element arranged inside the air cushion at the at least one opening to at least partially prevent a flow-through of air from a first direction; and
   an air-permeable flat structure arranged at an outer side of the sleeve in a region of the at least one opening,
   wherein the closure element is flexible and has a channel-shaped design at least upon the flow of air from a second direction opposite the first direction, and
   wherein the closure element is configured to press against the air-permeable flat structure from inside the air cushion in a restraint state in which the air cushion is under pressure compared to surroundings of the air cushion.

2. The air cushion according to claim 1, wherein the closure element has parallel or converging limiting walls in a flown-through state.

3. The air cushion according to claim 2, wherein a main flow direction of the closure element clearly deviates from an angle vertical to the surface defined by the opening when flowing through air in the second direction.

4. The air cushion according to claim 2, wherein the closure element is fastened to the sleeve.

5. The air cushion according to claim 2, wherein the closure element has several air-permeable recesses.

6. The air cushion according to claim 2, wherein the closure element is flat in a state that is not flown through and has a recess which is clearly smaller than the opening of the sleeve.

7. The air cushion according to claim 2, wherein the closure element has a screw-like pre-orientation, such that it is tube-shaped in the unwound direction and disk-shaped in the wound direction.

8. The air cushion according to claim 2, wherein the air-permeable flat structure covers the opening.

9. The air cushion according to claim 8, wherein the flat structure forms a part of the sleeve.

10. The air cushion according to claim 8, wherein the flat structure is a mesh.

11. The air cushion according to claim 1, wherein a main flow direction of the closure element clearly deviates from an angle vertical to the surface defined by the opening when flowing through air in the second direction.

12. The air cushion according to claim 1, wherein the closure element is fastened to the sleeve.

13. The air cushion according to claim 1, wherein the closure element has several air-permeable recesses.

14. The air cushion according to claim 1, wherein the closure element is flat in a state that is not flown through and has a recess which is clearly smaller than the opening of the sleeve.

15. The air cushion according to claim 1, wherein the air-permeable flat structure covers the opening.

16. The air cushion according to claim 15, wherein the flat structure forms a part of the sleeve.

17. The air cushion according to claim 15, wherein the flat structure is a mesh.

18. The air cushion according to claim 1, wherein a binding element is applied to the closure element.

19. The air cushion according to claim 1, wherein a separation element is applied to the closure element.

20. The air cushion according to claim 1, wherein the air cushion comprises a plurality of openings and each of the plurality of openings is arranged with a respective closure element.

21. The air cushion according to claim 1, wherein the closure element comprises a plastic film.

22. The air cushion according to claim 1, wherein the closure element comprises a silicone skin.

23. The air cushion according to claim 1, wherein each of the sides comprises a plurality of the planar elements and each of the planar elements has a plurality of openings.

24. An air bag for a vehicle, comprising:
   an air cushion including
      a support structure including a plurality of sides and a plurality of tube-shaped hollow bodies on each of the plurality of sides, the tube-shaped hollow bodies being connected to each other and planar elements disposed between the hollow bodies;
      a sleeve including at least one opening;
      a closure element arranged at the at least one opening to at least partially prevent a flow-through of air from a first direction; and
      an air-permeable flat structure arranged at an outer side of the sleeve in a region of the at least one opening,
      wherein the closure element is flexible and has a channel-shaped design at least upon the flow of air from a second direction opposite the first direction, and
      wherein the closure element is configured to press against the air-permeable flat structure from inside the air bag in a restraint state in which the air bag is under pressure compared to surroundings of the air bag.

25. The air bag according to claim 24, wherein each of the sides comprises a plurality of the planar elements and each of the planar elements has a plurality of openings.

* * * * *